United States Patent
Takeda et al.

(10) Patent No.: US 7,977,844 B2
(45) Date of Patent: Jul. 12, 2011

(54) INDUCTOR-TYPE SYNCHRONOUS MACHINE

(75) Inventors: Toshio Takeda, Tokyo (JP); Tomoya Oota, Tokyo (JP); Hiroyuki Togawa, Tokyo (JP); Hidehiko Sugimoto, Fukui-ken (JP); Toru Okazaki, Osaka (JP)

(73) Assignees: IHI Corporation (JP); Sumitomo Electric Industries, Ltd. (JP)

( * ) Notice: Subject to any disclaimer, the term of this patent is extended or adjusted under 35 U.S.C. 154(b) by 283 days.

(21) Appl. No.: 12/305,694

(22) PCT Filed: Jun. 20, 2007

(86) PCT No.: PCT/JP2007/062453
§ 371 (c)(1),
(2), (4) Date: Mar. 30, 2009

(87) PCT Pub. No.: WO2007/148736
PCT Pub. Date: Dec. 27, 2007

(65) Prior Publication Data
US 2010/0127594 A1    May 27, 2010

(30) Foreign Application Priority Data
Jun. 23, 2006  (JP) .................................. 2006-174010

(51) Int. Cl.
*H02K 1/12*   (2006.01)
(52) U.S. Cl. ........................................ 310/257; 310/162
(58) Field of Classification Search .................. 310/257, 310/263, 269, 216.102, 162, 166
See application file for complete search history.

(56) References Cited

U.S. PATENT DOCUMENTS

| | | | | |
|---|---|---|---|---|
| 4,004,168 A | * | 1/1977 | Haydon | 310/41 |
| 4,241,270 A | * | 12/1980 | Haydon et al. | 310/164 |
| 4,823,038 A | * | 4/1989 | Mizutani et al. | 310/257 |
| 7,446,442 B2 | * | 11/2008 | Horiike | 310/49.07 |
| 7,649,298 B2 | * | 1/2010 | Enomoto et al. | 310/257 |
| 7,701,109 B2 | * | 4/2010 | Ishikawa et al. | 310/257 |
| 2007/0090720 A1 | * | 4/2007 | Aoki et al. | 310/257 |

(Continued)

FOREIGN PATENT DOCUMENTS

JP   54-116610   9/1979

(Continued)

OTHER PUBLICATIONS

Decision on Grant in related Russian Patent Application No. 2009101184/09, with English language translation thereof, 10 pages, Jun. 20, 2007.

(Continued)

*Primary Examiner* — Thanh Lam
(74) *Attorney, Agent, or Firm* — Ostrolenk Faber LLP

(57) ABSTRACT

An inductor-type synchronous machine having an axial gap structure, which has a shaft portion at the center thereof, the machine includes: a field-side stator which has a yoke made of a magnetic material and a field body protruding from the yoke in an axial direction of the shaft portion to form an N pole and an S pole in a radial direction; a rotor which has N pole inductors disposed so as to be opposed to the N pole formed by the field body and S pole inductors disposed so as to be opposed to the S pole formed by the field body; and an armature-side stator in which an armature coil is disposed so as to be opposed to the N pole inductors and the S pole inductors.

3 Claims, 4 Drawing Sheets

U.S. PATENT DOCUMENTS

2008/0018196 A1* 1/2008 Enomoto et al. .............. 310/257
2009/0160288 A1* 6/2009 Calley ........................... 310/257

FOREIGN PATENT DOCUMENTS

| | | |
|---|---|---|
| JP | 04-304159 | 10/1992 |
| JP | 6-86517 | 3/1994 |
| JP | 2002-354770 | 12/2002 |
| JP | 2003-521206 A | 7/2003 |
| JP | 2003-284302 A | 10/2003 |
| JP | 2003-284303 A | 10/2003 |
| JP | 2005-224001 A | 8/2005 |
| RU | 2 237 338 | 9/2004 |
| RU | 2 265 945 | 12/2005 |
| SU | 330512 | 4/1972 |
| SU | 610254 | 5/1978 |
| WO | WO 01/52391 | 7/2001 |

OTHER PUBLICATIONS

International Search Report dated Sep. 25, 2007, issued in corresponding international application No. PCT/JP2007/062453.

* cited by examiner

INDUCTOR-TYPE SYNCHRONOUS MACHINE

CROSS REFERENCE TO RELATED APPLICATIONS

The present application is a 35 U.S.C. §371 National Phase conversion of PCT/JP2007/062453, filed Jun. 20, 2007, which claims benefit of Japanese Application No. 2006-174010, filed Jun. 23, 2006, the disclosure of which is incorporated herein by reference. The PCT International Application was published in the Japanese language.

TECHNICAL FIELD

The present invention relates to an inductor-type synchronous machine rotating with the synchronization of the polarity change of an armature and the rotation of a rotating shaft.

BACKGROUND ART

In the past, electric generators or motors having a rotor in which a field coil is disposed, a stator in which an armature coil is disposed so as to be opposed to the field coil and a rotating shaft connected and fixed to the rotor have been used. In case of this type of synchronous machine, the rotating field coil has been supplied with electric power by a slip ring connected to one end of the rotating shaft (for example, see Patent Documents 1 and 2).

Patent Document 1: Japanese Patent Application, First Publication No. 54-116610

Patent Document 2: Japanese Patent Application, First Publication No. 6-86517

DISCLOSURE OF THE INVENTION

Problems to be Solved by the Invention

However, it is required that a large amount of current flow to the coil when a large rotating force is obtained by the above-described conventional inductor-type synchronous machine. Therefore, the size of the whole machine including the coil increases. In addition, since a normal conductor coil is disposed in the rotor, it is required that a large amount of current flow to the coil when the output of the rotating shaft is increased. Accordingly, the structure for supplying electric power to the coil with a rotation operation becomes complicated and increases in size.

The present invention was conceived in view of the above-described problem. Particularly, an object of the present invention is to provide an inductor-type synchronous machine which can be downsized in an axial direction.

Means for Solving the Problem

In order to achieve the above object, a first aspect of the present invention employs an inductor-type synchronous machine having an axial gap structure which has a shaft portion at the center thereof. The inductor-type synchronous machine includes: a field-side stator which has a yoke made of a magnetic material and a field body protruding from the yoke in an axial direction of the shaft portion to form an N pole and an S pole in a radial direction; a rotor which has N pole inductors disposed so as to be opposed to the N pole formed by the field body and S pole inductors disposed so as to be opposed to the S pole formed by the field body; and an armature-side stator in which an armature coil is disposed so as to be opposed to the N pole inductors and the S pole inductors.

In the present invention, the N pole inductors and the S pole inductors can be disposed to surround the field body in the radial direction.

A second aspect according to the present invention employs the inductor-type synchronous machine according to the first aspect, in which the field body is a field coil, an engaging groove engaging with the field coil is provided in a side surface of the rotor around the shaft portion, a part of the N pole inductors is disposed so as to be opposed to one of the outer circumferential side or the inner circumferential side of the field coil while facing the engaging groove, and a part of the S pole inductors is disposed so as to be opposed to the other of the outer circumferential side or the inner circumferential side of the field coil while facing the engaging groove.

In the present invention, by engaging the field coil with the engaging groove of the rotor, the field coil can be disposed so as to be stored in the rotor. Accordingly, only the thickness required for the yoke may be considered as the thickness of the field-side stator in the axial direction thereof, and the length of the synchronous machine in the direction of the rotating shaft can be reduced.

A third aspect according to the present invention employs the inductor-type synchronous machine according to the second aspect, in which at least one of the field coil and the armature coil is made of a superconducting material.

In the present invention, the sizes of the field body and the armature coil can be reduced compared to those of the conventional machine even when applying the current amount which is identical to that is applied to the conventional machine, and the superconducting motor can be further downsized.

Effect of the Invention

According to the present invention, the length of the synchronous machine in the axial direction of the rotating shaft can be reduced as compared to the case where the field body is disposed so as to be opposed to the N pole inductor and the S pole inductor in the axial direction.

DESCRIPTION OF REFERENCE NUMERALS AND SIGNS

1: Superconducting motor (Inductor-type synchronous machine)

2: Rotating shaft (Shaft portion)
3: Yoke
5: Field coil (Field body)
6A, 6B: Field-side stator
7: N pole inductor
8: S pole inductor
10A, 10B: Rotor
10a: Engaging groove
11: Armature coil
12: Armature-side stator

BEST MODE FOR CARRYING OUT THE INVENTION

An embodiment of the present invention will be described with reference to FIGS. 1 to 6.

Figure 1:
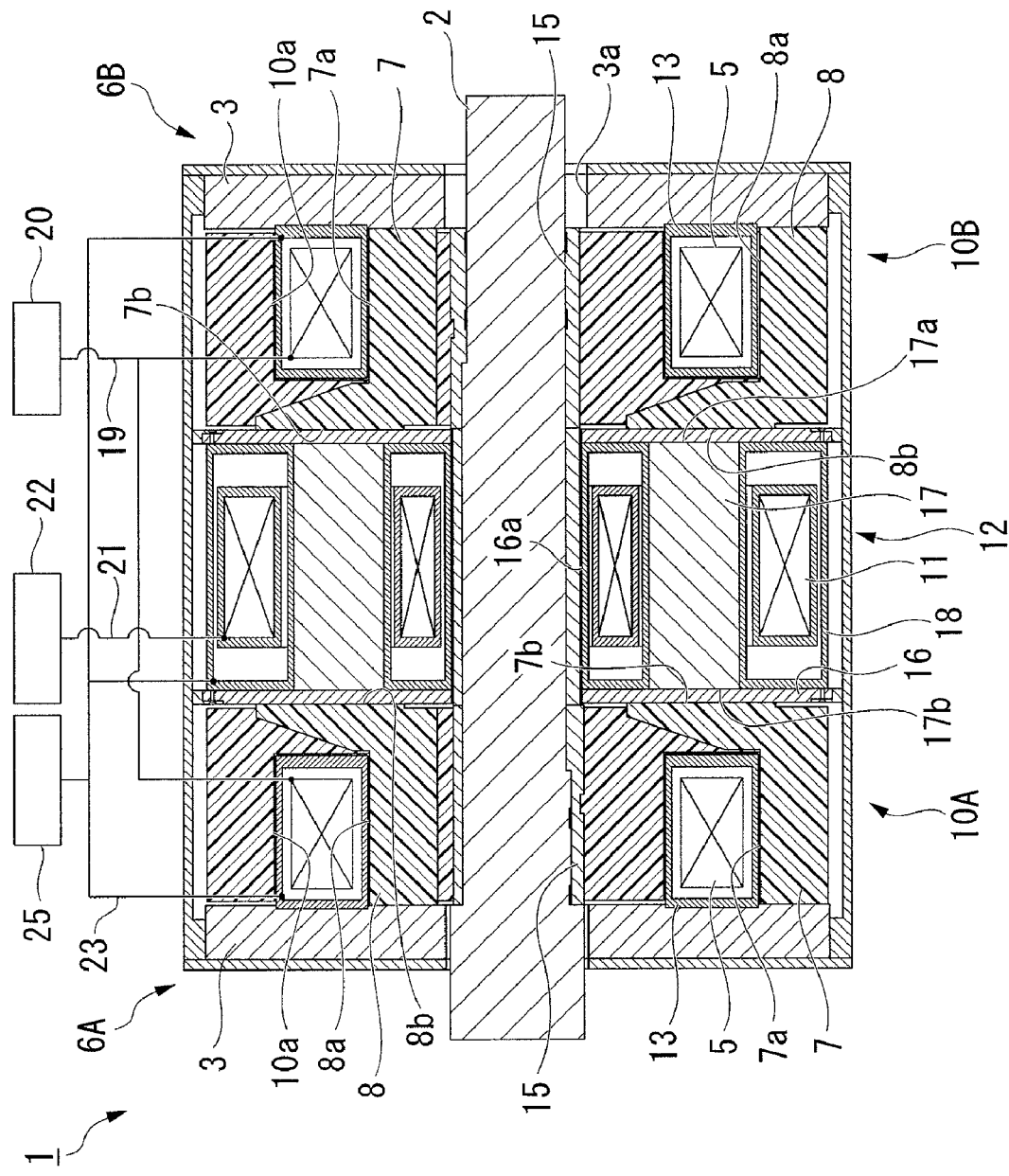
FIG. 1 is a cross-sectional view schematically showing the internal structure of a superconducting motor according to an embodiment of the present invention.

As shown in FIG. 1, a superconducting motor (inductor-type synchronous machine) 1 according to the present invention is a superconducting motor having an axial gap structure, which has a rotating shaft (shaft portion) 2 at the center thereof. The superconducting motor includes: a pair of field-side stators 6A and 6B, each of which has a yoke 3 made of a magnetic material and a field coil (field body) 5 protruding from the yoke 3 in an axial direction of the rotating shaft 2 to form an N pole and an S pole in a radial direction and which are bilaterally disposed do as to be opposed to each other in the direction of the rotating shaft 2; a pair of rotors 10A and 10B, each of which has N pole inductors 7 disposed so as to be opposed to the N pole formed by the field coil 5 and magnetized and S pole inductors 8 disposed to be opposed to the S pole formed by the field coil 5 and magnetized and which are bilaterally disposed so as to be opposed to each other in the direction of the rotating shaft 2; and an armature-side stator 12 which has armature coils 11 disposed so as to be opposed to the N pole inductors 7 and the S pole inductors 8, supports the rotating shaft 2 so that the rotating shaft can rotate and penetrate therethrough, and is held in between the pair of rotors 10A and 10B.

The yoke 3 is made of a magnetic material such as permendur, silicon steel sheet, iron, permalloy or the like and is formed in a disk shape having a predetermined thickness in the direction of the rotating shaft 2. At the center of the yoke 3, a through hole 3a having a diameter so as to be penetrated by the rotating shaft 2 is provided. Field heat insulation refrigerant containers 13, which are formed in an annular shape around the rotating shaft 2, protrude in the direction of the rotating shaft 2 from inner surfaces of the yoke 3 opposed to each other. The field heat insulation refrigerant containers 13 are filled with liquid nitrogen and the field coil 5 is stored therein.

The field coil 5 is made of a bismuth-based or yttrium-based superconducting material. The field coil is stored in the field heat insulation refrigerant containers 13 so as to be wound around the rotating shaft 2. For this reason, when the field coil 5 is excited, a magnetic pole is generated each of an outer circumferential side and an inner circumferential side which are divided in the radial direction.

Figure 2:
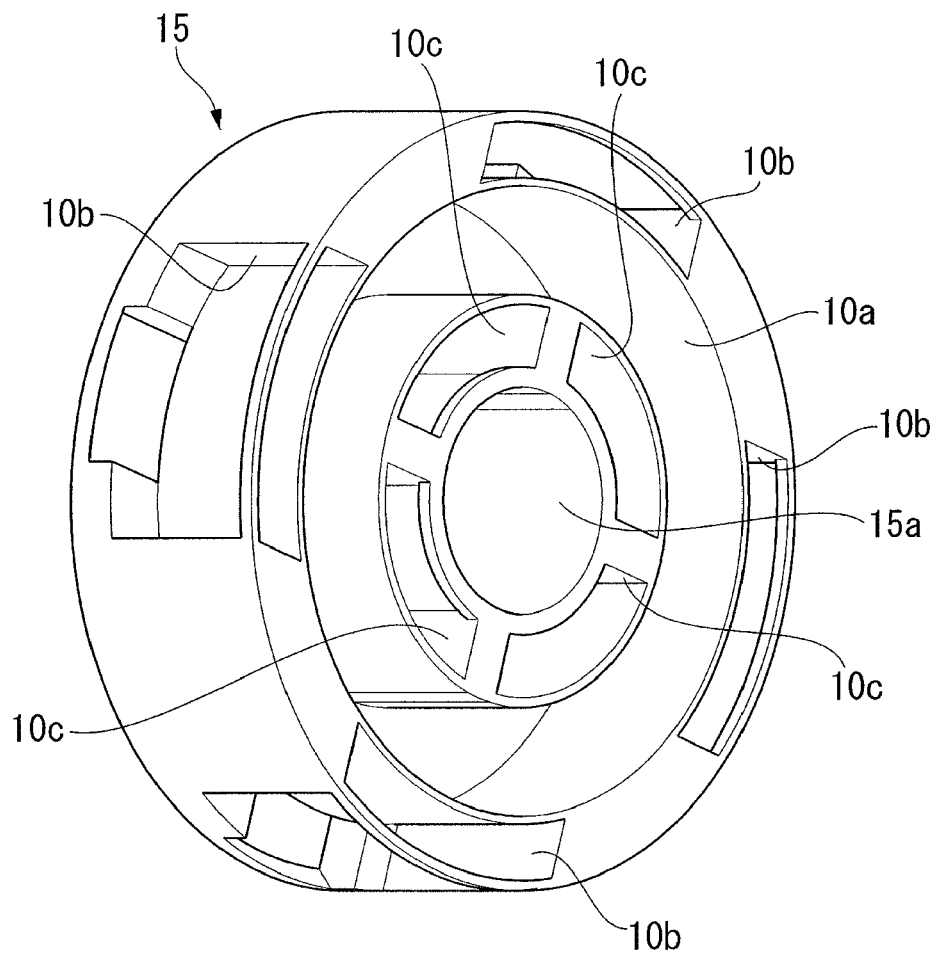
FIG. 2 is a perspective view showing a rotor body of the superconducting motor according to the embodiment of the present invention.

As shown in FIG. 2, the pair of rotors 10A and 10B each has a rotor body 15 made of a nonmagnetic material such as FRP or stainless steel and support the rotating shaft 2 to be fixed by a fitting hole 15a provided at the center thereof. In an outer surface of the rotor body 15 opposed to the yoke 3, an engaging groove 10a engaging the field coil 5 is formed in an annular shape around the rotating shaft 2. A plurality of storage concave portions 10b and 10c are formed in a circumferential direction so as to surround the engaging hole 10a and to store the N pole inductors 7 or the S pole inductors 8 therein.

Figure 3:
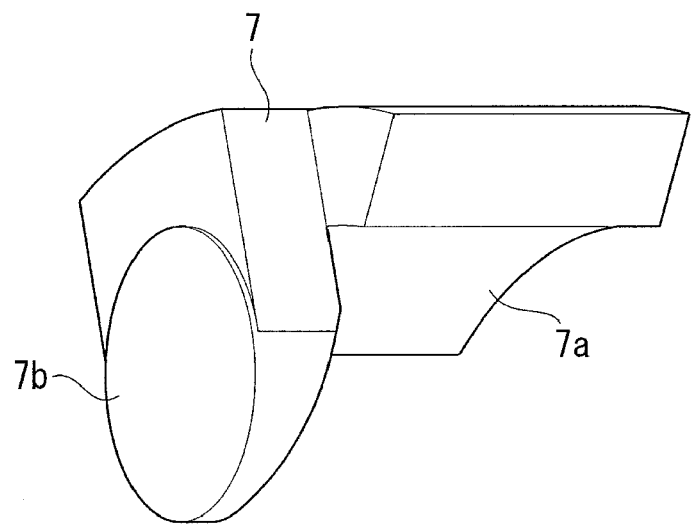
FIG. 3 is a perspective view showing an N pole inductor of the superconducting motor according to the embodiment of the present invention.
Figure 4:
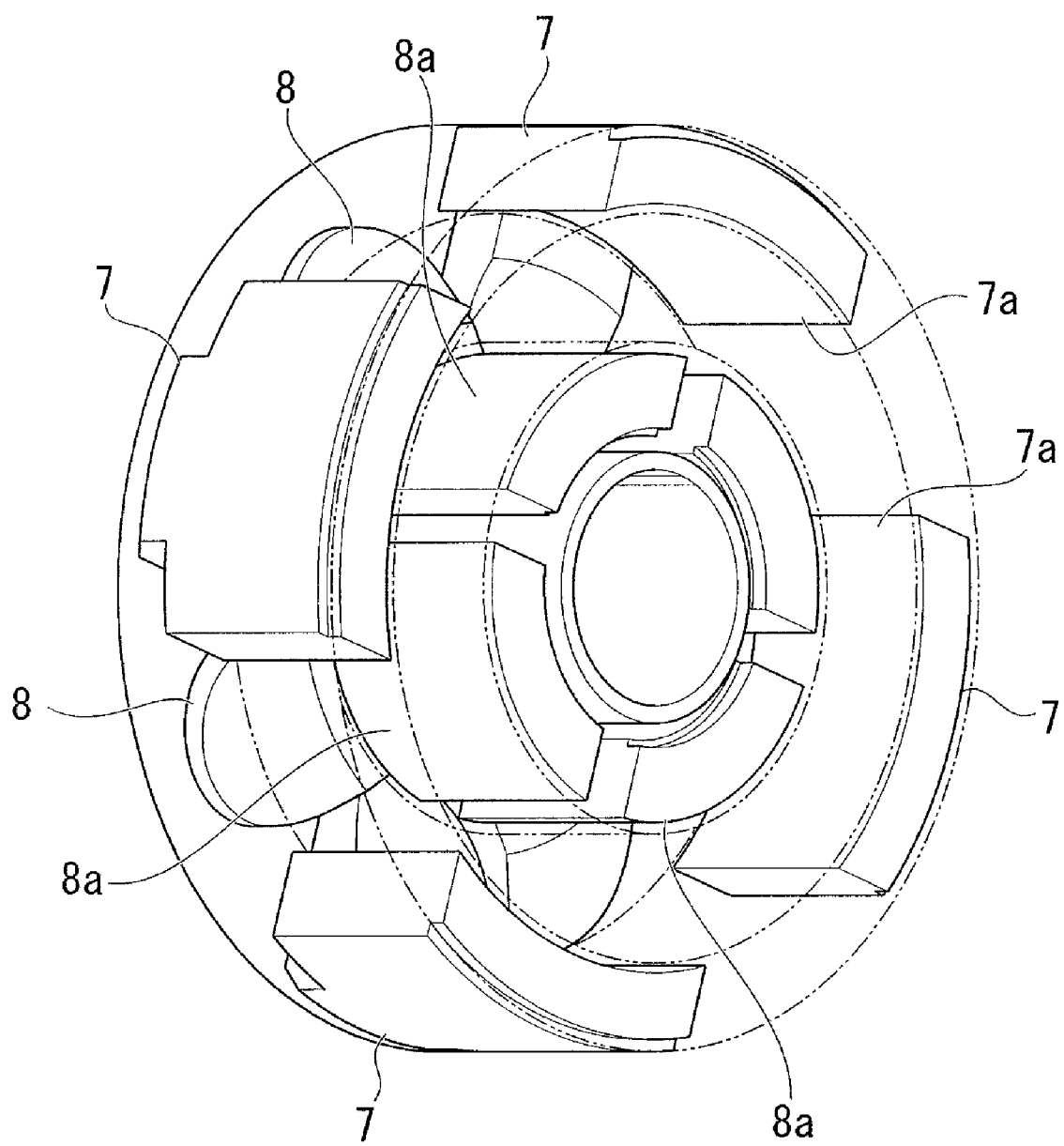
FIG. 4 is a perspective view showing the arrangement of N pole inductors and S pole inductors of the superconducting motor according to the embodiment of the present invention.
Figure 5:
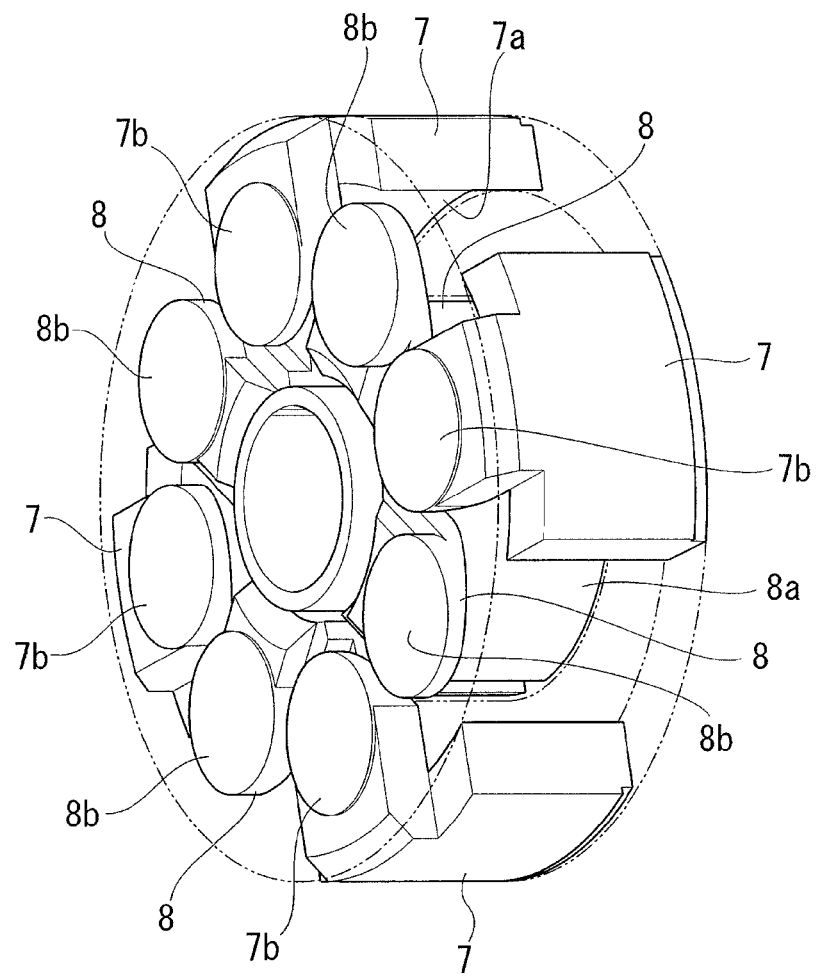
FIG. 5 is a perspective view showing the arrangement of N pole inductors and S pole inductors of the superconducting motor according to the embodiment of the present invention.

As shown in FIG. 3, the N pole inductors 7 are provided with one end surface 7a which is formed in a curved surface shape so as to be opposed to the field heat insulation refrigerant container 13 from outward or inward in the radial direction, and the other end surface 7b which is formed in an elliptical plate shape to be long in the circumferential direction of the rotor body 15 and be short in the radial direction when being opposed to a cylindrical magnetic body 17 to be described later or in a substantially disk shape. As shown in FIGS. 4 and 5, a total of 4 N pole inductors 7 are each disposed at a position point-symmetrical with respect to the center of the rotor body 15 in a penetrating manner in the direction of the rotating shaft 2. In this case, the one end surface 7a of each N pole inductor 7 is disposed to be opposed to an N pole generation position of the field coil 5 while facing the engaging groove 10a. The other end surface 7b is disposed to be opposed to the armature coil 11.

Figure 6:
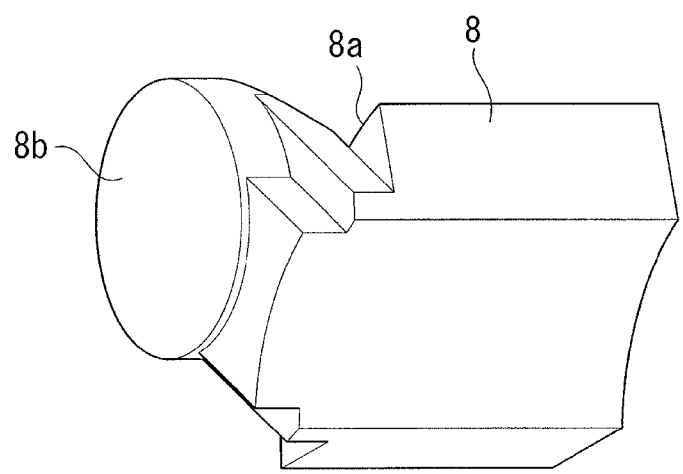
FIG. 6 is a perspective view showing an S pole inductor of the superconducting motor according to the embodiment of the present invention.

As shown in FIG. 6, the S pole inductors 8 are provided with one end surface 8a which is formed in a curved shape so as to be opposed to the field heat insulation refrigerant container 13 from outward or inward in the radial direction, and the other end surface 8b which is formed in an elliptical plate shape so as to be long in the circumferential direction of the rotor body 15 and be short in the radial direction when being opposed to a cylindrical magnetic body 17 to be described later or in a substantially disk shape. As shown in FIGS. 4 and 5, a total of four S pole inductors 8 are respectively disposed at a position point-symmetrical with respect to the center of the rotor body 15 and different in phase by about 90 degrees with respect to the N pole inductor 7 in a penetrating manner in the direction of the rotating shaft 2. In this case, the one end surface 8a of each S pole inductor 8 is disposed so as to be opposed to an S pole generation position of the field coil 5 while facing the engaging groove 10a. The other end surface 8b is disposed so as to be opposed to the armature coil 11. The N pole inductors 7 and the S pole inductors 8 are made of a magnetic material such as permendur, silicon steel sheet, iron, permalloy or the like.

The armature-side stator 12 has a stator body 16 made of a nonmagnetic material such as FRP or stainless steel. At the center of the stator body 16, a through hole 16a through which the rotating shaft 2 passes is disposed. In the stator body 16, the cylindrical magnetic bodies 17 made of a high permeability material such as permendur, silicon steel sheet, iron, permalloy or the like and armature heat insulation refrigerant containers 18 formed in a thick cylinder shape and having a hollow portion therein are disposed so as to penetrate the stator body 16. The six cylindrical magnetic bodies 17 are incorporated at predetermined intervals on the same circumference around the through hole 16a so that both end surfaces 17a and 17b thereof are opposed to the N pole inductor 7 and the S pole inductor 8.

The armature heat insulation refrigerant containers 18 are disposed in the stator body 16 while being fitted to the outside of each cylindrical magnetic body 17. In each armature heat insulation refrigerant container 18, the armature coil 11 made of a bismuth-based or yttrium-based superconducting material is disposed so as to be wound on the inner circumferential surface of each armature heat insulation refrigerant container 18.

A DC current source 20 is connected to the field coil 5 via a DC electric wiring 19. Further, an AC current source 22 is connected to the armature coil 11 via an AC electric wiring 21. Meanwhile, a cooler 25 using liquid nitrogen as refrigerant via cooling piping 23 is connected to the field heat insulation refrigerant container 13 and the armature heat insulation refrigerant container 18. The cooler 25 is connected to a driving power source (not shown) for cooling and circulating the liquid nitrogen.

Next, the operation of the superconducting motor 1 according to this embodiment will be described.

First, the cooler 25 is driven to supply liquid nitrogen to the field heat insulation refrigerant container 13 and the armature heat insulation refrigerant container 18 via the cooling piping 23. The field coil 5 and the armature coil 11 disposed in the field heat insulation refrigerant container 13 and the armature heat insulation refrigerant container 18 are each cooled to a superconducting state.

Next, DC current is supplied to each field coil 5 from the DC current source 20. At this time, depending on the direction of the DC current, for example, an N pole is formed outward in the radial direction of the field coil 5 and an S pole is formed inward in the radial direction in the field-side stator 6A. Accordingly, the N pole is guided to the other end surface 7b of the N pole inductor 7, which is opposed to the armature-side stator 12. On the other hand, the S pole is guided to the other end surface 8b of the S pole inductor 8, which is opposed to the armature-side stator 12. The same magnetic poles are formed depending on the direction of DC current in the field-side stator 6B and the N and S poles are guided to the other end surfaces 7b and 8b of the N pole inductor 7 and the S pole inductor 8, respectively.

In this state, three-phase AC current is supplied to the armature coil 11 from the AC current source 22. At this time, by phase differences between the three phases, a rotating magnetic field rotating around the rotation shaft 2 is generated in the armature coil 11. The rotating magnetic field generates a rotating force around the rotating shaft line in the same direction between the pair of rotors 10A and 10B toward the N pole inductor 7 and the S pole inductor 8, and thus the rotating shaft 2 is rotated.

According to this superconducting motor 1, currents flow to the field coil 5 and the armature coil 11 to excite them. As a result, the rotating shaft 2 is rotated via the pair of rotors 10A and 10B and a rotating force can be provided. In this case, since the field coil 5 and the armature coil 11 are made of a superconducting material, the sizes of the field coil and the armature coil can be reduced compared to those of the conventional motor even when applying the current amount which is identical to that is applied to the conventional motor, and the superconducting motor can be downsized.

In addition, since no coil is disposed in the pair of rotors 10A and 10B, only the field coil 5 and the armature coil 11 disposed in the stators may be supplied with electric power and cooled, and the electric system and the cooling system can be simplified in structure. In this case, by engaging the field coil 5 with the engaging groove 10a of the rotor body 15, the field coil 5 can be disposed in the rotor body 15 so as to be surrounded by the N pole inductor 7 and the S pole inductor 8 in the radial direction. Accordingly, as the thickness of each of the field-side stators 6A and 6B in the axial direction thereof, only the thickness required for the yoke 3 may be considered without the consideration of the protrusion amount of the field coil 5 to the rotor 10A or 10B, and the length of the motor in the direction of the rotating shaft 2 can be reduced.

The technical scope of the present invention is not limited to the above-described embodiment and various changes can be made without departing from the spirit and scope of the present invention. For example, in the above-described embodiment, the inductor-type synchronous machine is the superconducting motor. However, the inductor-type synchronous machine may be used as an electric generator which generates electric power by rotating the rotating shaft 2.

In addition, in the above-described embodiment, the present invention employs the inner rotor type in which the rotating shaft 2 connected to the centers of the pair of rotors 10A and 10B rotates with the pair of rotors 10A and 10B, but is not limited thereto. For example, the present invention may provide an inductor-type synchronous machine of an outer rotor type in which a shaft portion disposed at the center thereof is a fixed shaft and an outer circumference is connected to a pair of rotors.

Further, the number of the combination of the N pole inductors and the S pole inductors and the number of the armature coils are not limited to the above description. For example, the number of the N pole inductors and the number of the S pole inductors may be two, and the number of the armature coils may be three. In addition, the number of the N pole inductors and the number of the S pole inductors may be eight, and the number of the armature coils may be twelve.

What is claimed is:

1. An inductor-type synchronous machine having an axial gap structure which has a shaft portion at the center thereof, the inductor-type synchronous machine comprising:
    a field-side stator which has a yoke made of a magnetic material and a field body protruding from the yoke in an axial direction of the shaft portion to form an N pole and an S pole in a radial direction;
    a rotor which has N pole inductors disposed so as to be opposed to the N pole formed by the field body and S pole inductors disposed so as to be opposed to the S pole formed by the field body; and
    an armature-side stator in which an armature coil is disposed so as to be opposed to the N pole inductors and the S pole inductors.

2. The inductor-type synchronous machine according to claim 1,
    wherein the field body is a field coil,
    an engaging groove engaging with the field coil is provided in a side surface of the rotor around the shaft portion,
    a part of the N pole inductors is disposed so as to be opposed to one of the outer circumferential side or the inner circumferential side of the field coil while facing the engaging groove, and
    a part of the S pole inductors is disposed so as to be opposed to the other of the outer circumferential side or the inner circumferential side of the field coil while facing the engaging groove.

3. The inductor-type synchronous machine according to claim 2,
    wherein at least one of the field coil and the armature coil is made of a superconducting material.

* * * * *